United States Patent
Ueno et al.

(10) Patent No.: US 7,065,959 B2
(45) Date of Patent: Jun. 27, 2006

(54) FILTER REGENERATION CONTROL

(75) Inventors: Shouichirou Ueno, Yokohama (JP);
Junichi Kawashima, Yokosuka (JP);
Makoto Otake, Yokohama (JP);
Terunori Kondou, Yokohama (JP);
Naoya Tsutsumoto, Yokohama (JP);
Takao Inoue, Yokohama (JP);
Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 131 days.

(21) Appl. No.: 10/937,271

(22) Filed: Sep. 10, 2004

(65) Prior Publication Data
US 2005/0060990 A1    Mar. 24, 2005

(30) Foreign Application Priority Data
Sep. 19, 2003 (JP) .............................. 2003-328666

(51) Int. Cl.
F01N 3/00 (2006.01)
F02M 25/06 (2006.01)
F02N 3/02 (2006.01)

(52) U.S. Cl. .................. 60/295; 60/278; 60/297; 60/311

(58) Field of Classification Search .......... 60/278, 60/295, 297, 311
See application file for complete search history.

(56) References Cited

U.S. PATENT DOCUMENTS

| | | | | |
|---|---|---|---|---|
| 4,211,075 A | * | 7/1980 | Ludecke et al. | 60/285 |
| 5,713,198 A | * | 2/1998 | Aoki et al. | 60/277 |
| 6,622,480 B1 | * | 9/2003 | Tashiro et al. | 60/295 |
| 6,758,033 B1 | * | 7/2004 | Ueno et al. | 60/277 |
| 6,904,752 B1 | * | 6/2005 | Foster et al. | 60/295 |
| 2004/0123584 A1 | | 7/2004 | Schaller | |

FOREIGN PATENT DOCUMENTS

| | | |
|---|---|---|
| DE | 199 61 164 A1 | 6/2001 |
| DE | 101 08 182 A1 | 8/2002 |
| DE | 101 08 720 A1 | 9/2002 |
| JP | 05-106427 A | 4/1993 |
| JP | 2003-254038 A | 9/2003 |

OTHER PUBLICATIONS

U.S. Appl. No. 10/942,009, filed Sep. 16, 2004, Kondou et al.
U.S. Appl. No. 10/942,010, filed Sep. 16, 2004, Otake et al.

* cited by examiner

Primary Examiner—Thomas Denion
Assistant Examiner—Loren Edwards
(74) Attorney, Agent, or Firm—Foley & Lardner LLP

(57) ABSTRACT

A regeneration control device, which regenerates a filter (13) for trapping particulate matter in exhaust gas from an engine (1), is disclosed. The filter (13) supports a catalyst which oxidizes unburnt components in the exhaust gas. The regeneration control device has a temperature sensor (14) which detects a filter inlet exhaust gas temperature (Tdpf_in_mea); and a microcomputer (22). The microcomputer (22) is programmed to compute a filter outlet exhaust gas temperature (Tdpf_out_cal), not including temperature rise due to oxidation reaction of unburnt components based on the detected inlet exhaust gas temperature; compute the filter bed temperature (Tbed_cal) based on the detected inlet exhaust gas temperature and computed outlet exhaust gas temperature; compute a temperature rise ($\Delta Thc1$) due to oxidation reaction of unburnt components; correct the bed temperature based on the computed temperature rise ($\Delta Thc1$).

10 Claims, 4 Drawing Sheets

FILTER REGENERATION CONTROL

FIELD OF THE INVENTION

This invention relates an engine exhaust gas purification device, and more specifically to the improvement of a technique for regenerating a filter which traps particulate matter in engine exhaust gas.

BACKGROUND OF THE INVENTION

JP-A-H5-106427 published by the Japan Patent Office in 1993 discloses a filter for an engine exhaust gas system to purify particulate matter (hereafter, referred to as "exhaust gas particulates") discharged from an engine such as a diesel engine. The filter is regenerated by oxidizing or burning the trapped exhaust gas particulates at a predetermined interval. Regeneration of the filter is performed by raising the exhaust gas temperature. The increase of exhaust gas temperature is achieved by engine control, such as applying an angle retardation to the fuel injection timing or performing a secondary injection in addition to the main injection.

The temperature of the filter surface on which particulates are deposited is referred to as "bed temperature". The bed temperature of the filter is computed based on the exhaust gas temperature on the filter inlet side and outlet side. The engine control is performed so that this bed temperature becomes a targeted value. In this way, exhaust gas particulates can be burned efficiently.

SUMMARY OF THE INVENTION

In a CSF type filter (catalyzed soot filter) which supports a catalyst for oxidizing unburnt components (e.g. HC and CO) in the engine exhaust gas, not only the combustion heat of exhaust gas particulates, but also the reaction heat in the oxidation of the unburnt components, is generated during regeneration.

As the reaction heat due to these unburnt components is not taken into consideration in computing the bed temperature mentioned above, it may not be possible to perform a suitable control of the bed temperature during regeneration. Therefore, the bed temperature in regeneration may be too high relative to the target temperature. Alternatively, depending on the discharge rate of unburnt components, local hot parts may occur in the filter, and the filter may deteriorate.

It is therefore an object of this invention to improve the accuracy and performance of regeneration control while avoiding deterioration of the filter due to overheating.

In order to achieve the above object, this invention provides a regeneration control device which regenerates a filter for trapping particulate matter in exhaust gas from an engine. The filter supports a catalyst which oxidizes unburnt components in the exhaust gas. The regeneration control device comprises a heat generating device which raises a bed temperature of the filter and burns particulate matter trapped by the filter, in order to regenerate the filter, a first temperature sensor which detects a filter inlet exhaust gas temperature; and a microcomputer. The microcomputer is programmed to compute a filter outlet exhaust gas temperature, not including temperature rise due to oxidation reaction of unburnt components based on the detected inlet exhaust gas temperature, compute the filter bed temperature based on the detected inlet exhaust gas temperature and computed outlet exhaust gas temperature, compute a temperature rise due to oxidation reaction of unburnt components, correct the bed temperature based on the computed temperature rise, and control the heat generating device based on the corrected bed temperature.

The details as well as other features and advantages of this invention are set forth in the remainder of the specification and are shown in the accompanying drawings.

DESCRIPTION OF THE PREFERRED EMBODIMENTS

Figure 1:
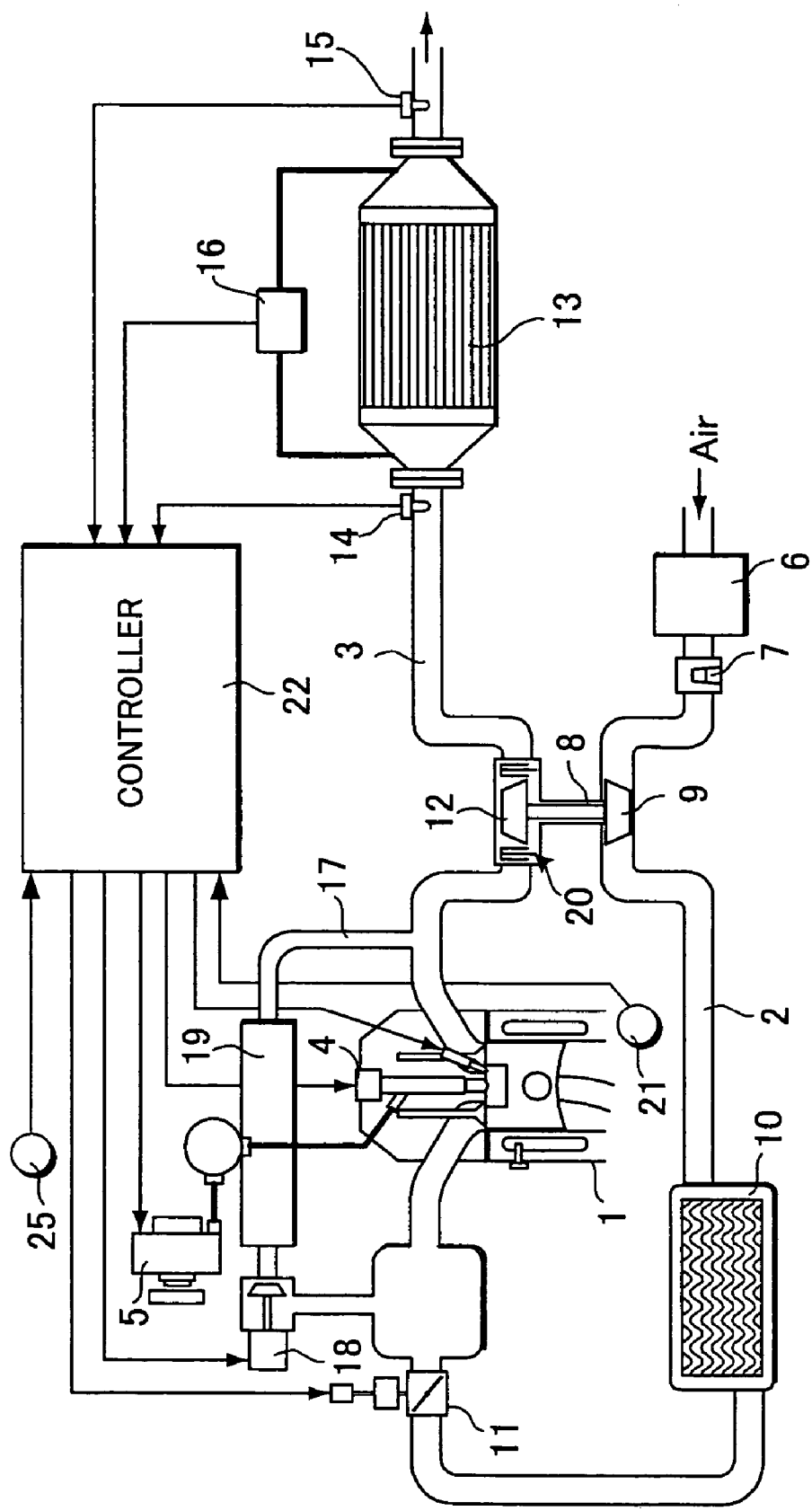
FIG. 1 is a schematic diagram of an engine system to which this invention can be applied.

Referring to FIG. 1, an engine system to which this invention can be applied comprises an engine body 1, an intake passage 2 and an exhaust passage 3. A fuel injector 4 and fuel injection pump 5 are attached to the engine body 1. In this specification, the engine body 1 and fuel injector 4 may be collectively referred to as the engine. An air cleaner 6, airflow meter 7, compressor 9 of an exhaust gas turbocharger 8, intercooler 10 and throttle valve 11 are installed in the intake passage 2 from the upstream side. A turbine 12 of the exhaust gas turbocharger 8 and a filter 13 which traps exhaust gas particulates are installed in the exhaust passage 3 from the upstream side. The filter 13 supports the catalyst for oxidizing unburnt components. The filter 13 is a diesel particulate filter (DPF) for a diesel engine.

A temperature sensor 14 measures the inlet temperature of the filter 13. A temperature sensor 15 measures the outlet temperature of the filter 13. A differential pressure sensor 16 detects the differential pressure of the filter 13. An EGR (exhaust gas recirculation) passage 17 connects the intake passage 2 and exhaust passage 3. An EGR valve 18 and EGR cooler 19 are installed in the middle of the EGR passage. The exhaust gas turbocharger 8 is provided with a variable nozzle 20 which can adjust the flow rate of the exhaust gas flowing into the turbine 12. A crank angle sensor 21 detects an engine rotation speed Ne and a crank position. In addition, the engine system is provided with various auxiliary devices.

A microcomputer-based controller 22 comprises a microcomputer comprising a central processing unit, read only memory (ROM), random access memory (RAM) and an input/output interface (I/O interface). Based on signals from the above mentioned sensors, the controller 22 controls one or more of a fuel injection timing, injection amount, opening of the throttle valve 11, EGR amount, opening of the variable nozzle 20 and load of auxiliary devices, and increases/adjusts the exhaust gas temperature by this engine control.

The controller 22 functions as part of a regeneration control device which adjusts the exhaust gas temperature by engine control, and a computing device. The engine and the exhaust passage 3 function as a heat generating device which burns particulate matter by increasing the bed temperature of the filter, in order to regenerate the filter.

An outline of the regeneration control performed by the controller 22 is as follows.

The controller 22 continually detects a load Q and rotation speed Ne in the background as an engine running state while performing the regeneration control, and computes an amount of particulates trapped in the filter (particulate trapped amount) using the load Q and rotation speed Ne.

As a typical value of the load Q, a fuel injection amount command value of the controller 22 is used, and as the rotation speed Ne, the signal of a crank angle sensor 21 is read. If the engine system is provided with a fuel injection amount detection sensor 25 which detects the fuel injection amount, the controller 22 may read the fuel injection amount as a load Q from the fuel injection amount detection sensor.

Various techniques for computing the particulate trapped amount in the filter are known. An example of a computation technique is shown below: A table which determines the discharge rate (which is a discharge amount in a fixed interval) of the particulates discharged from the engine according to the load Q and rotation speed Ne is experimentally obtained beforehand, and is stored in the ROM of the controller 22. The controller 22 computes a particulate trapped amount by integrating the read discharge rate at every fixed interval. Otherwise, the controller 22 computes a particulate trapped amount based on the aforesaid engine running state signal and a signal from a differential pressure sensor 16.

When the estimation amount for trapped particulates is equal to or more than a reference value at which regeneration should be started, the controller 22 determines the engine running state, and if the engine is running in a feasible filter regeneration region, it starts filter regeneration. The feasible filter regeneration region is an engine running region where the exhaust gas temperature required for regeneration can be efficiently obtained, and is set according to the engine characteristics. In filter regeneration for the engine system shown in FIG.1, engine control may be performed by any of intake air throttling by a throttle valve 11, angle retardation of the fuel injection timing, secondary injection, cutback of the EGR amount, and opening control of the variable nozzle 20. Thereby, an exhaust gas temperature of 300 degrees C. or more required for particulate regeneration is ensured.

During regeneration control, the controller 22 computes the bed temperature of the filter 13, and controls the engine so that the computed bed temperature coincides with the target bed temperature. The target bed temperature is a temperature at which regeneration is efficiently performed, and overheating of the filter does not occur. The computation of bed temperature includes correction of the bed temperature.

Figure 2:
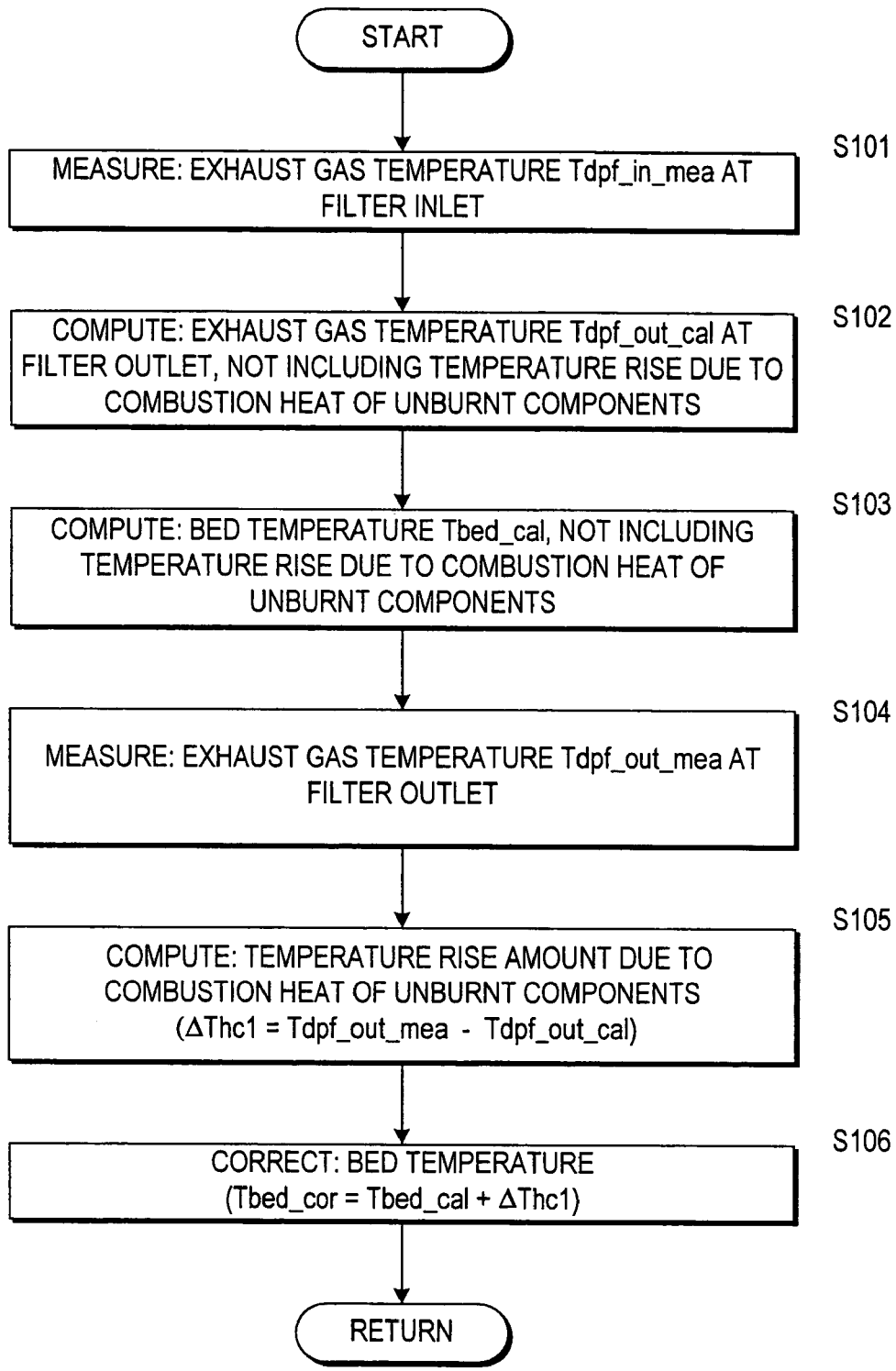
FIG. 2 is a flow chart showing a control routine relating to a first embodiment of the bed temperature computation of this invention.

Referring to FIG. 2, a first embodiment of the control routine relating to the bed temperature computation performed by the controller 22 will now be described. This control routine is periodically performed, for example by a timer interrupt at a fixed interval of 10 milliseconds.

In a step S101, an exhaust gas temperature Tdpf_in_mea of the filter inlet side is measured based on a signal from the temperature sensor 14.

Next, in a step S102, an exhaust gas temperature Tdpf_out_cal on the filter outlet side assuming that there is no combustion of unburnt components, is computed using the measured inlet temperature Tdpf_in_mea. The outlet temperature Tdpf_out_cal can be estimated from the engine running state and measured inlet temperature Tdpf_in_mea. For example, the fuel injection amount Q and engine rotation speed Ne showing the the engine running state, and the inlet temperature Tdpf_in_mea, are used as parameters, and the outlet temperature Tdpf_out_cal is calculated by referring to a map set beforehand to give the outlet temperature Tdpf_out_cal when there is no combustion of unburnt components based on these parameters. The map is defined experimentally and stored in the RAM of the controller 22. For example, this map can be obtained by measuring the outlet temperature for each engine running state and each inlet temperature, using the filter 13 which has not been pre-charged with a catalyst for oxidizing unburnt components. Otherwise, the outlet temperature for each engine running state and each inlet temperature is measured, providing another filter charged with a catalyst for oxidizing unburnt components upstream of the filter 13 and providing a cooling device for cooling the exhaust gas from said other filter to a temperature which would be realized without said other filter. The outlet temperature Tdpf_out_cal increases, the larger the fuel injection amount Q and the engine rotation speed Ne, and the higher the inlet temperature is.

In a step S103, the bed temperature Tbed_cal of the filter is computed using the measured inlet temperature and calculated outlet temperature Tdpf_out_cal. The computed bed temperature Tbed_cal can be calculated by referring to a map set beforehand from the measured inlet temperature and computed outlet temperature Tdpf_out_cal. For example, this map can be experimentally obtained by measuring the bed temperature of the filter 13 for each inlet temperature and each outlet temperature. Alternatively, the map can be obtained by calculating the bed temperature of the filter 13 for each inlet temperature and each outlet temperature, by a thermal simulation.

As the outlet temperature Tdpf_out_cal computed in the step S102 does not include the temperature rise due to the combustion heat of unburnt components, the calculated bed temperature Tbed_cal also does not include the temperature rise due to the combustion heat of unburnt components. Therefore, the calculated bed temperature Tbed_cal means the bed temperature Tbed_cal assuming there is no combustion of unburnt components.

In a step S104, the actual exhaust gas temperature Tdpf_out_mea on the filter outlet side is measured by the temperature sensor 15.

Next, in a step S105, a temperature rise amount $\Delta Thc1$ due to combustion of unburnt components is calculated by subtracting the outlet temperature Tdpf_out_cal computed in the step S103 from the measured outlet temperature Tdpf_out_mea.

In a step S106, a corrected bed temperature Tbed_cor is computed by adding the calculated temperature rise amount $\Delta Thc1$ to the bed temperature Tbed_cal computed in the step S103. In this way, the corrected bed temperature Tbed_cor becomes a value near the actual bed temperature by taking the temperature rise amount $\Delta Thc1$ due to combustion of unburnt components into account.

During regeneration control, the controller 22 controls the engine so that the calculated corrected bed temperature Tbed_cor coincides with the target bed temperature.

Figure 3:
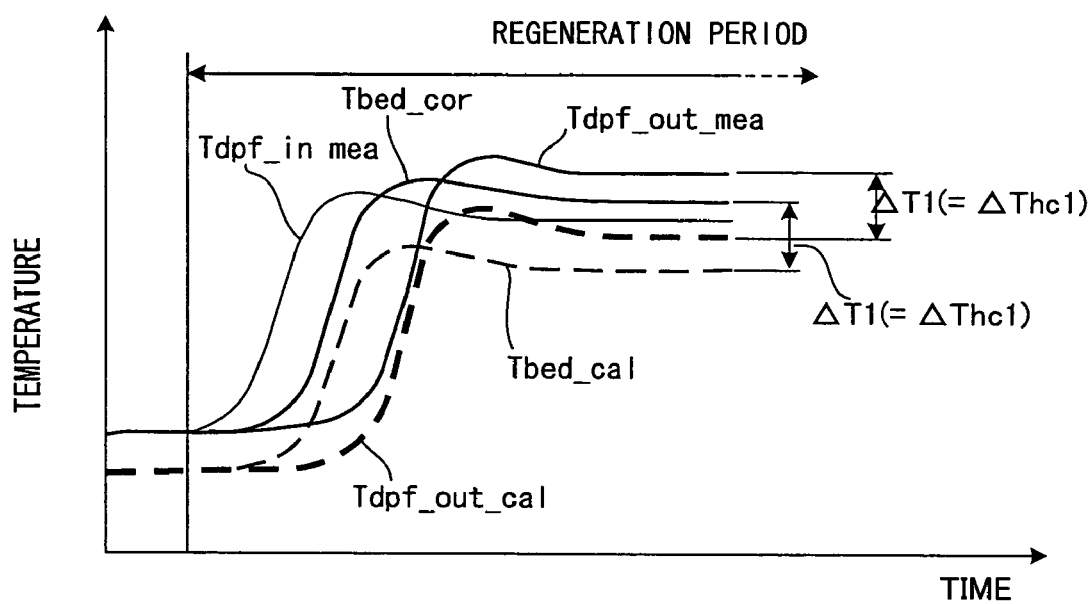
FIG. 3 is a diagrammatic chart showing the temporal change of bed temperature during regeneration and its estimation values.

FIG. 3 shows the estimated temperature and real temperature during filter regeneration. A temperature difference $\Delta T1$ between the calculated outlet temperature and the actual outlet temperature is caused by generation of heat due to an oxidation reaction of unburnt components. The result of adding the temperature difference $\Delta T1$ to the computed bed temperature Tbed_cal which does not include the temperature rise due to the oxidation reaction of unburnt components is the corrected bed temperature Tbed_cor. The corrected bed temperature Tbed_cor is the temperature between the actual inlet temperature and actual outlet temperature, so calculation of the corrected bed temperature Tbed_cor is satisfactory.

According to this embodiment, a value near the real bed temperature which contains the rise of the bed temperature due to the aforesaid unburnt components is obtained as the corrected bed temperature Tbed_cor. Due to this, by performing the aforesaid regeneration control using Tbed_cor, filter regeneration is performed efficiently, and overheating of the filter is prevented.

Figure 4:
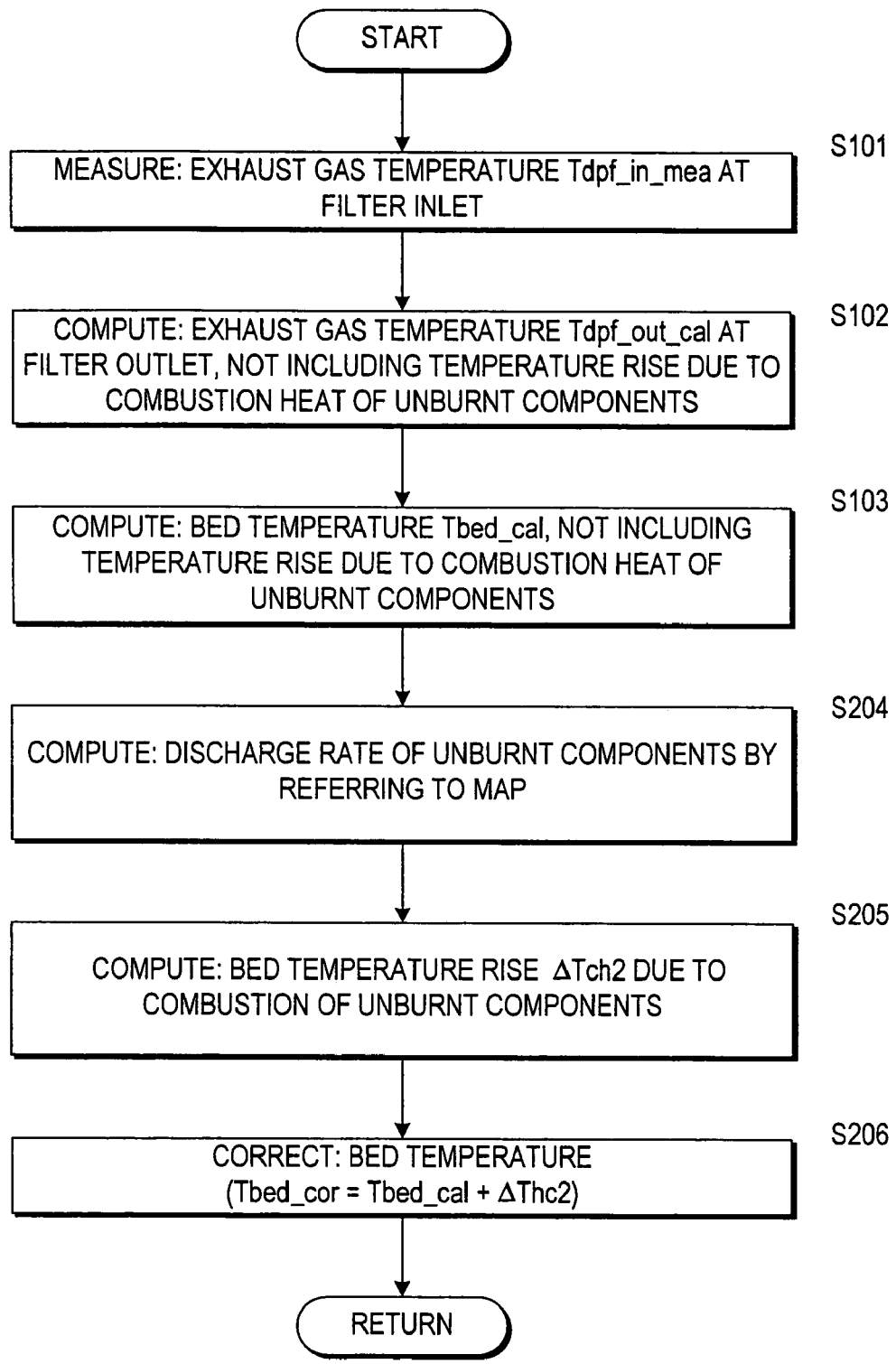
FIG. 4 is a flow chart showing a control routine relating to a second embodiment of the bed temperature computation of this invention.

Referring to the flowchart of FIG. 4, a second embodiment of the control routine relating to the bed temperature computation performed by the controller 22, will now be described. The processing of the step S101-step S103 is identical to that of FIG. 2, and the outlet temperature Tdpf_out_cal and the bed temperature Tbed_cal which do not contain the temperature rise due to the combustion heat of unburnt components are computed based on the measured inlet temperature Tdpf_in_mea.

This embodiment differs from the first embodiment in that a temperature rise amount ΔTch2 due to the recaction of unburnt components is computed from the unburnt component amount.

In a step S204, the discharge rate of HC and CO which are unburnt components is first calculated by referring to a map. The discharge rate (which is a discharge amount in a fixed interval) of unburnt components is determined by the engine running state. Therefore, a map which gives the discharge rate of unburnt components from an engine running state, for example, with the aforesaid fuel injection amount Q and rotation speed Ne, is experimentally obtained beforehand, and the discharge rate of unburnt components is calculated by referring to this map. This map can be obtained by measuring the discharge rate of unburnt components such as HC and CO for each engine running state, using commercially available measurement device for measuring the amount or density of unburnt components in exhaust gas.

Next, in a step S205, the bed temperature rise ΔTch2 due to combustion of unburnt components is computed from the calculated discharge rate of unburnt components, the heat generation due to combustion of unburnt components, the efficiency with which the heat generation amount is converted to filter temperature rise, and the heat capacity of the filter.

In a step S206, the corrected bed temperature Tbed_cor is computed by adding the computed bed temperature rise ΔTch2 to the bed temperature Tbed_cal computed in the step S103.

According to the second embodiment, the corrected bed temperature Tbed_cor is computed based on the discharge rate of unburnt components, so deterioration of the filter due to overheating can be avoided, and the precision and efficiency of regeneration control can be improved.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

The entire contents of Japanese Patent Application P2003-328666 (filed Sep. 19, 2003) are incorporated herein by reference.

What is claimed is:

1. A regeneration control device which regenerates a filter for trapping particulate matter in exhaust gas from an engine, the filter supporting a catalyst which oxidizes unburnt components in the exhaust gas, the regeneration control device comprising:
   a heat generating device which raises a bed temperature of the filter and burns particulate matter trapped by the filter, in order to regenerate the filter,
   a first temperature sensor which detects a filter inlet exhaust gas temperature; and
   a microcomputer programmed to:
   compute a filter outlet exhaust gas temperature, not including temperature rise due to oxidation reaction of unburnt components based on the detected inlet exhaust gas temperature,
   compute the filter bed temperature based on the detected inlet exhaust gas temperature and computed outlet exhaust gas temperature,
   compute a temperature rise due to oxidation reaction of unburnt components,
   correct the bed temperature based on the computed temperature rise, and
   control the heat generating device based on the corrected bed temperature.

2. The regeneration control device as defined in claim 1, further comprising a second temperature sensor which detects the filter outlet exhaust gas temperature,
   wherein the microcomputer is further programmed to compute the temperature rise due to oxidation reaction of unburnt components based on the difference between the detected outlet exhaust gas temperature and the computed outlet exhaust gas temperature.

3. The regeneration control device as defined in claim 1, further comprising a sensor which detects an engine running state,
   wherein the microcomputer is further programmed to:
   compute a discharge rate of unburnt components based on the detected engine running state, and
   compute the temperature rise due to oxidation reaction of unburnt components based on the computed discharge rate of unburnt components.

4. The regeneration control device as defined in claim 1, further comprising a sensor which detects an engine running state,
   wherein the microcomputer comprises a map which gives a filter outlet exhaust gas temperature based on a filter inlet exhaust gas temperature and an engine running state, and
   the microcomputer is programmed to compute the filter outlet exhaust gas temperature based on the detected inlet exhaust gas temperature and the detected engine running state by referring to the map.

5. The regeneration control device as defined in claim 1, wherein the microcomputer comprises a map which gives a bed temperature based on a filter inlet exhaust gas temperature and filter outlet exhaust gas temperature, and
   the microcomputer is programmed to compute the filter bed temperature based on the detected inlet exhaust gas temperature and computed outlet exhaust gas temperature by referring to the map.

6. The regeneration control device as defined in claim 3, wherein the engine running state comprises at least one of an engine rotation speed and engine load.

7. The regeneration control device as defined in claim 1, wherein the heat generating device comprises an engine, and the microcomputer is further programmed to:
   control an engine exhaust gas temperature so that the corrected bed temperature coincides with a target bed temperature during filter regeneration.

8. The regeneration control device as defined in claim 7, wherein an engine system including the engine is provided with one of a fuel injector, turbocharger, EGR device, throttle valve and auxiliary device, and the microcomputer is further programmed to control the engine exhaust gas temperature by anyone of fuel injection timing control, fuel injection amount control, variable nozzle exhaust gas turbocharger nozzle opening control, EGR control, intake air amount control and auxiliary device load control.

9. A regeneration control device which regenerates a filter for trapping particulate matter in exhaust gas from an engine, the filter supporting a catalyst which oxidizes unburnt components in the exhaust gas, the regeneration control device comprising:

heat generating means which raises a bed temperature of the filter and burns particulate matter trapped by the filter, in order to regenerate the filter, temperature detecting means which detects a filter inlet exhaust gas temperature;

means for computing a filter outlet exhaust gas temperature, not including temperature rise due to oxidation reaction of unburnt components based on the detected inlet exhaust gas temperature;

means for computing the filter bed temperature based on the detected inlet exhaust gas temperature and computed outlet exhaust gas temperature;

means for computing a temperature rise due to oxidation reaction of unburnt components;

means for correcting the bed temperature based on the computed temperature rise; and means for controlling said heat generating means based on the corrected bed temperature.

10. A regeneration control method for regenerating a filter which traps particulate matter in exhaust gas from an engine, the filter supporting a catalyst which oxidizes unburnt components in the exhaust gas, the regeneration control method comprising:

detecting a filter inlet exhaust gas temperature;

computing a filter outlet exhaust gas temperature, not including temperature rise due to oxidation reaction of unburnt components based on the detected inlet exhaust gas temperature;

computing the filter bed temperature based on the detected inlet exhaust gas temperature and computed outlet exhaust gas temperature;

computing a temperature rise due to oxidation reaction of unburnt components;

correcting the bed temperature based on the computed temperature rise; and controlling a heat generating device based on the corrected bed temperature, the heat generating device being capable of raising a bed temperature of the filter and burning particulate matter trapped by the filter, in order to regenerate the filter.

* * * * *